US008799460B2

(12) United States Patent
Cockrell

(10) Patent No.: US 8,799,460 B2
(45) Date of Patent: Aug. 5, 2014

(54) METHOD AND SYSTEM OF PROVIDING A SUMMARY OF WEB APPLICATION PERFORMANCE MONITORING

(75) Inventor: Kip Cockrell, Weatherford, TX (US)

(73) Assignee: Cellco Partnership, Basking Ridge, NJ (US)

( * ) Notice: Subject to any disclaimer, the term of this patent is extended or adjusted under 35 U.S.C. 154(b) by 122 days.

(21) Appl. No.: 13/425,092

(22) Filed: Mar. 20, 2012

(65) Prior Publication Data

US 2013/0254373 A1   Sep. 26, 2013

(51) Int. Cl.
*G06F 15/173* (2006.01)
(52) U.S. Cl.
USPC .......................................................... 709/224
(58) Field of Classification Search
CPC ........ H04L 43/02; H04L 43/04; H04L 43/045
USPC .................................................. 709/223–224
See application file for complete search history.

(56) References Cited

U.S. PATENT DOCUMENTS

| 6,141,680 A * | 10/2000 | Cucchiara ..................... 709/201 |
| 7,336,613 B2 * | 2/2008 | Lloyd et al. .................... 370/237 |
| 7,698,251 B2 * | 4/2010 | Brelsford et al. ............. 709/209 |
| 7,936,695 B2 * | 5/2011 | Oran ............................ 370/252 |
| 7,991,869 B2 * | 8/2011 | Bonjour et al. ............... 709/223 |
| 8,028,200 B2 | 9/2011 | Ivanov et al. |
| 2005/0021306 A1 * | 1/2005 | Garcea et al. ................. 702/186 |
| 2007/0174452 A1 * | 7/2007 | Nixon et al. .................. 709/224 |
| 2011/0126059 A1 | 5/2011 | Klein |
| 2012/0102190 A1 * | 4/2012 | Durham et al. ............... 709/224 |

OTHER PUBLICATIONS

"Product Family Brief: Wily Introscope", Wily Introscope, 2009, pp. 1-15, CA Wily Technology.
"Product Brief: CA Wily Introscope", CA Wily Introscope, 2007, 9 pages, CA Wily Technology.
"Introscope Release 8.2.3 ReadMe", CA Wily Introscope 8, May 2010, pp. 1-68, Wily Technology Inc.
"Overview Guide, Version 8.2", CA Wily Introscope, Jan. 2010, pp. 1-74, CA Wily Technology.

* cited by examiner

*Primary Examiner* — Lance L Barry

(57) ABSTRACT

The performance of several application servers is monitored. Based on the monitoring, performance metrics of the several application servers is collected by several clusters of collectors. Each cluster of collectors is associated with a respective manager of performance metrics. Each manager of performance metrics receives collected performance metrics from their respective collectors. An Enterprise Manager Extension plug-in module enables each manager of performance metrics to synthesize the performance metrics of its respective cluster of collectors. A summary manager summarizes the synthesized performance metrics of the various server clusters received from the manager of performance metrics and provides it as an output presentation.

26 Claims, 5 Drawing Sheets

METHOD AND SYSTEM OF PROVIDING A SUMMARY OF WEB APPLICATION PERFORMANCE MONITORING

BACKGROUND

In recent years, the use of web-based applications has become commonplace. For many businesses, success and failure can depend on the health and availability of these web-based applications. For example, if a customer cannot complete an online transaction efficiently and the provider cannot quickly identify and fix the problem, the customer may move on to complete the transaction elsewhere. In this regard, many web application monitoring tools provide incident detection, notification, root-cause analysis, historical data reporting, and the like, thereby creating an environment of constant improvement and a high quality of service. For example, such data can help identify bottlenecks, reduce the likelihood of outages, and lower costs associated with maintaining complex web applications.

As the web application environment increases in complexity and the number of transactions grows, successfully maintaining a web application becomes increasingly difficult. Today, the sheer volume of transaction data is not always capable of being processed by a single server. Indeed, application performance monitoring data is frequently distributed across different servers or even different groups or "farms" of server, which may even be in different locations and maintained by separate IT groups.

Performance problems that are identified on one server are frequently relevant to users of other servers as well. Currently, there is no application to synthesize information gathered at different servers or groups of servers so as to provide a comprehensive transaction visibility across an entire infrastructure of web monitoring servers.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable centralized audit and error handling in a distributed application data processing system, such as enterprise applications implemented as web services type middleware running on one or more computer platforms to improve the auditing and error handling processes. In the examples, the centralized audit and error handling functions may be implemented as one or more Java based applications.

Figure 1:
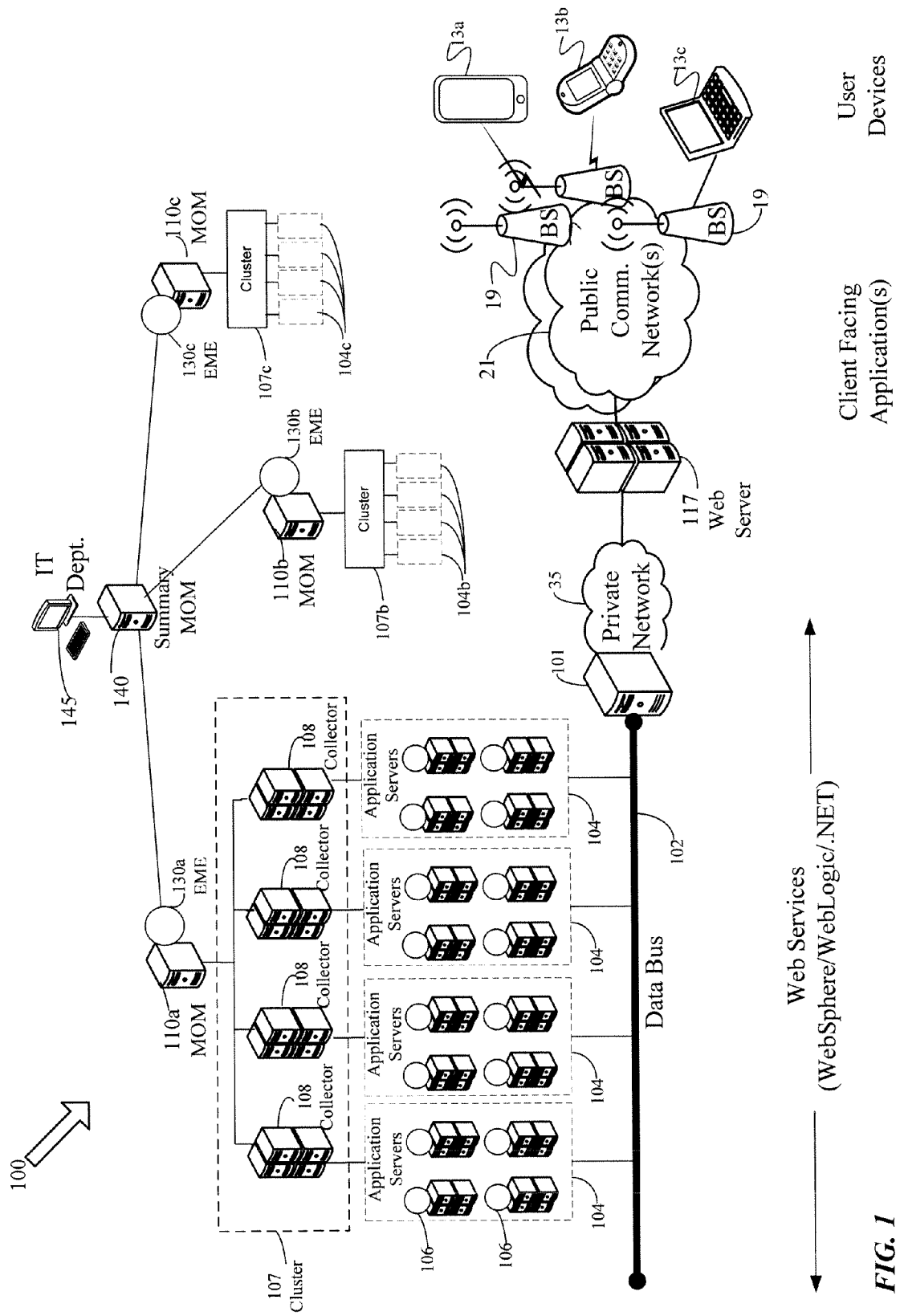
FIG. 1 illustrates a system offering one or more web applications as on-line service to users as well as elements performing various functions related to monitoring the web applications to provide metrics and alerts to Information Technology (IT) department personnel.

Reference now is made in detail to the examples illustrated in the accompanying drawings and discussed below. FIG. 1 illustrates a system 100 including elements for various functions as may be involved in monitoring web applications to provide metrics and alerts to a centralized presentation. For example, the centralized presentation may be a user interface, such as the monitor of the IT department 145. In the example of FIG. 1, the web applications are applications or an enterprise that offers mobile communication services to users of mobile devices, however, the centralized monitoring techniques may be applied to web applications of other enterprises.

The example of FIG. 1 includes a mobile communication network 21 as may be operated by a carrier or service provider to provide a wide range of mobile communication services and ancillary services or features to its subscriber customers and associated mobile device users. The example of FIG. 1 includes many application servers (i.e., in groups 104, 104*b*, and 104*c*). Each application server includes an agent (e.g., 106) that is configured to monitor the performance of its respective application server. Agents within a group of application servers 104 report to their respective collector. A group of collectors forms a cluster (i.e., 107, 107*b*, and 107*c*). Each cluster in turn communicates with its respective manager of performance metrics, e.g., Manager of Managers (MOM) (i.e., 110*a*, 110*b*, and 110*c* respectively). A summary manager of performance metrics e.g., Summary Manager of Managers (SMOM) 140 summarizes synthesized performance metrics from the MOMs and provides the summarized synthesized performance metrics as an output presentation.

The elements indicated by the reference numeral 100 generally include the network elements thereof as well as other systems operated by or on behalf of the carrier, although the mobile devices typically are sold to the carrier's customers. The mobile communication network 21 provides communications between mobile devices as well as communications for the mobile devices with networks and stations not separately shown outside the mobile communication network 21.

Several mobile devices appear in the drawing, to represent examples of the mobile devices that may receive various services via the mobile communication network 21. Today, mobile devices typically take the form portable handsets, smart-phones, tablet computers or personal digital assistants (PDAs), although they may be implemented in other form factors, including consumer and business electronic devices. For purposes of illustration, 13*a* represents a touch-screen type mobile device, 13*b* represents a feature phone, and 13*c* represents a computer having mobile communication capabilities. Although shown as a laptop PC, the device 13*c* may be a net-book, a tablet, etc. The mobile devices 13*a*, 13*b*, and 13*c*, for example, may support certain text and image communications, such as email, picture communication and web browsing applications.

The mobile devices 13*a*, 13*b*, and 13*c* are examples of user platforms that may be used for a variety of communication functions, including for purposes of this discussion, to obtain content through web applications from a content provider, such as application servers 104. The content provider may be a third party, in which case, the application servers 104 may be equipment owned and operated by or on behalf of that third party, although in our example, the carrier that operates the mobile communication network 21 also is the party providing the content to its customers that utilize the mobile devices 13*a*, 13*b*, and 13*c*. The network 21 provides mobile wireless communications services and content to those mobile devices as well as to other mobile devices (not shown), for example, via a number of base stations (BSs) 19. The mobile communication may be implemented in any of a variety of available mobile networks 21 and/or on any type of mobile device compatible with such a network 21, and the drawing shows only a very simplified example of a few relevant elements of the network 21 for purposes of discussion here.

The network 21 allows users of the mobile devices such as 13*a*, 13*b*, and 13*c* (and other mobile devices not shown) to initiate and receive telephone calls to each other. Further, network 15 typically offers a variety of data services via the Internet or via private networks like the exemplary network 35, such as downloads, web browsing, email, web applications, etc. Such data services may include services which allow the user of the mobile device to download and obtain on-line content through web applications, including content offered by the carrier and content offered by other enterprises.

The carrier also operates a number of systems that provide functions in support of the communications services and/or application services provided through the network 21, and those elements communicate with other nodes or elements of the network 21 via one or more web servers 117 and/or private IP type packet data networks 35 (sometimes referred to as an Intranet), i.e., a private networks. Generally, such systems are part of or connected for communication via the web server 117 and/or private network 35. Systems outside of the private network could serve the same functions as well. Examples of such systems, in this case operated by the network service provider as part of the overall network 100, which communicate through the web server 117 and intranet type network 35, include one or more application servers 104 as well as other servers used for providing web services, messaging middleware, and databases. Server 101 couples the private network 35 and the one or more application servers 104 via a data bus 102.

For example, a mobile device 13*a* communicates over the air with a base station 19 and through public communication network(s) 21 for various voice and data communications through the web server 117 and network 35 with one or more application servers 104. Application servers 104 may include any of a variety of common application or service functions. For example, a web server may provide a browser or other application on the user device (e.g., 13*a* to 13*c*) with page information for a particular on-line service. In the carrier example, such a service may be on-line access to mobile customer's accounts. In another example, the web server 117 may provide page displays of content available from the provider. The application servers 104 provide backend functionality in support of the on-line service facilitated through the web server 117. In the customer account example, the application servers 104 may process account related information and provide that information to the web server 117 for inclusion thereof in appropriate pages as transmitted to the user devices. In the content example, the application servers 104 may provide previews of available content for inclusion thereof in appropriate pages as transmitted to the user devices (e.g., 13*a* to 13*c*), supply the actual content as part of download transactions, and/or provide functions in support of billing for downloaded content.

Typically, business enterprises can monitor the operation of their servers 104, to identify bottlenecks, prevent potential outages, optimize resources, and lower costs associated with maintaining complex web applications on the servers 104. Indeed, it is not unusual for servers 104 to experience performance problems. In this regard, one or more of the servers 104 are connected to performance management elements. In one example, CA Wily Introscope® is used to monitor the performance of servers 104. Introscope elements include agents 106, an Enterprise Manager (EM) (e.g., 108), SmartStor (not shown), WebView (not shown), and a Workstation. In one embodiment, each collector 108 comprises several computers.

By way of example, FIG. 1 illustrates four application servers in each group of servers 104. Each application server has an agent 106 and each group of application servers 104 is in communication with its respective collector 108. Although four groups of servers 104 (with four application servers in each) are shown in the example of FIG. 1, the number of groups 104 or the number of application servers in each group may be different. For example, the relationship between the number of collectors 108 to the application servers in a group 104 may be based on the volume of metrics that each MOM (e.g., 110*a*) can process. Further, although each application server in a group 104 is shown in FIG. 1 to include several hardware computers, an application server may comprise one or several hardware computers.

Agents 106 collect and report application performance metrics. One agent is used per process (e.g., Java Virtual Machine (JVM) or Common Language Runtime (CLR) instance). For example, an agent 106 may be a Java Agent that collects performance data from applications running on the JVMs and sends the performance information to the their Introscope Enterprise Manager (EM) (e.g., 108). The total number of agents 106 depends on the size of the specific Introscope implementation. For example, in a large extended enterprise production environment, hundreds or more agents may be deployed to monitor web applications across the enterprise. These agents 106 collect performance metrics from their respective application servers 104. For example, performance metrics may include the number of failed transactions per server, average response times, number of lost connections, number of servers that are down, etc. The agents report these metrics to their respective Enterprise Manager (EM) (e.g., 108). An Enterprise Manager stores metrics reported by the multiple agents 106.

For large systems that generate large numbers of metrics, the Enterprise Managers can be clustered together. In this regard, Enterprise Managers are called collectors when clustered. Put differently, in large systems, an Enterprise Manager is referred to as a collector 108. A cluster 107 of collectors 108 integrates the resources of several computing devices (e.g., application severs 104) together for a common purpose. Each collector in the cluster acts as a repository of performance metrics. Each collector receives performance metrics from one or more agents 106 from application servers 104. The collector allows the collection of metrics from many web applications, application servers, and supporting systems. The metrics from all the collectors for a cluster are provided to Manager of Managers (MOM) 110*a* which synthesizes the metrics information from the cluster. A MOM 110*a* also manages the cluster operation. Each MOM (e.g., 110*a*) is a server that has an applicable MOM program running on it. In one example, the Enterprise Manager Extension (EME) (e.g., 130*a*) is another program running on the same hardware as the respective MOM (e.g., 110*a*). Thus, the MOM (e.g., 110*a*) scrubs and massages raw metrics collected by the collectors 108 and provides the information in a user friendly format through its respective EME (e.g., 130a) which is running on the same hardware as the MOM 110a.

For example, a MOM 110a communicates with each collector to obtain metrics data therefrom. The number of collectors a MOM 110a can accommodate depends on the volume of data it can handle. For example, per polling interval, the MOM may be able to handle metrics up to a certain threshold level (e.g., about 3 million metrics). If the MOM reaches this threshold (e.g., criterion), MOM processing may degrade. Thus, the processing may slow down and even crash. Accordingly, in very large systems, (e.g., configured to process more than 3 million metrics per polling interval) there are several MOMs (e.g., 110a, 110b, and 110c) that accommodate their clusters 107, 107b, and 107c respectively. In one example, each collector 108 communicates with its respective MOM (e.g., 110a) in a compatible version of Introscope.

Each cluster 107, 107b, and 107c has its respective farm of application servers (i.e., 104, 104b, and 104c). Each cluster 107, 107b, and 107c may have the same configuration (e.g., number of collectors) or a different configuration. Further, each farm of application servers 104, 104b, and 104c may have a different number of application servers. Thus, each MOM 110a, 110b and 110c may have a different number of collectors in its respective cluster (107, 107b, 107c). In one example, the application servers managed each MOM may provide application services through the same web server (e.g., 117).

In one example, each MOM (e.g., 110a, 110b, and 110c) includes a corresponding Enterprise Manager Extension (EME) (e.g., 130a, 130b, and 130c) to facilitate communication with a Summary Manager Of Managers (SMOM) 140. Each EME 130 comprises a configuration file that states what the SMOM 140 can collect from the MOM (e.g., 110a). As to the SMOM 140, it also includes an EME (not shown). The EME of the SMOM 140 is configured to poll each MOM and collect the information that is defined in the configuration file of each respective MOM (e.g., 130a, 130b, and 130c).

As noted, the MOM and several other software components are modules available from the CA Wily Introscope® suite of products. In such an example, the EME (e.g., 130a, 130b, and 130c) may be implemented as a plug-in to the Wily Introscope® MOM. The SMOM 140 may be implemented by an instance of the Wily Introscope® MOM configured to collect metrics from and/or provide management information (i.e., information provided in the configuration file to collect and synthesize metrics information) to the MOMs via EMEs, instead of from/to collectors.

Figure 4:
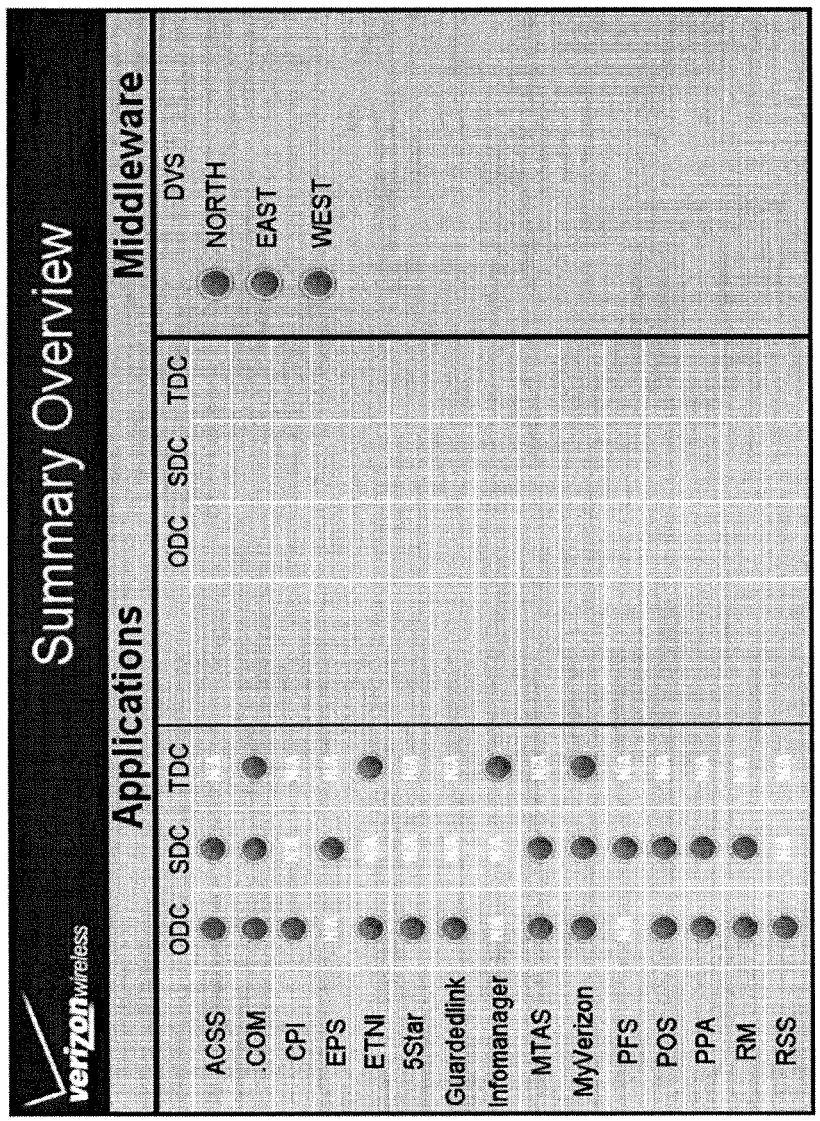
FIG. 4 illustrates an exemplary unified view of customer experiences and web infrastructure performance from a single perspective.

The SMOM 140 synthesizes the metrics information gathered by each MOM (e.g., 110a, 110b, and 110c), and provides a unified view of customer experiences and web infrastructure performance from a single perspective. FIG. 4 provides an example of such unified view at a terminal 145 of the SMOM 140. For example, an IT department does not need to access each MOM (e.g., 110a, 110b, and 110c) separately; instead, the IT department can learn about performance issues of all web applications across an entire enterprise from a single terminal 145. Such performance management enables consumers and producers of web services to monitor services across a vast enterprise immediately, detect problems proactively by having access to a larger application server information pool, and conserve IT time and effort from having to interpret information from each MOM separately.

Figure 2:
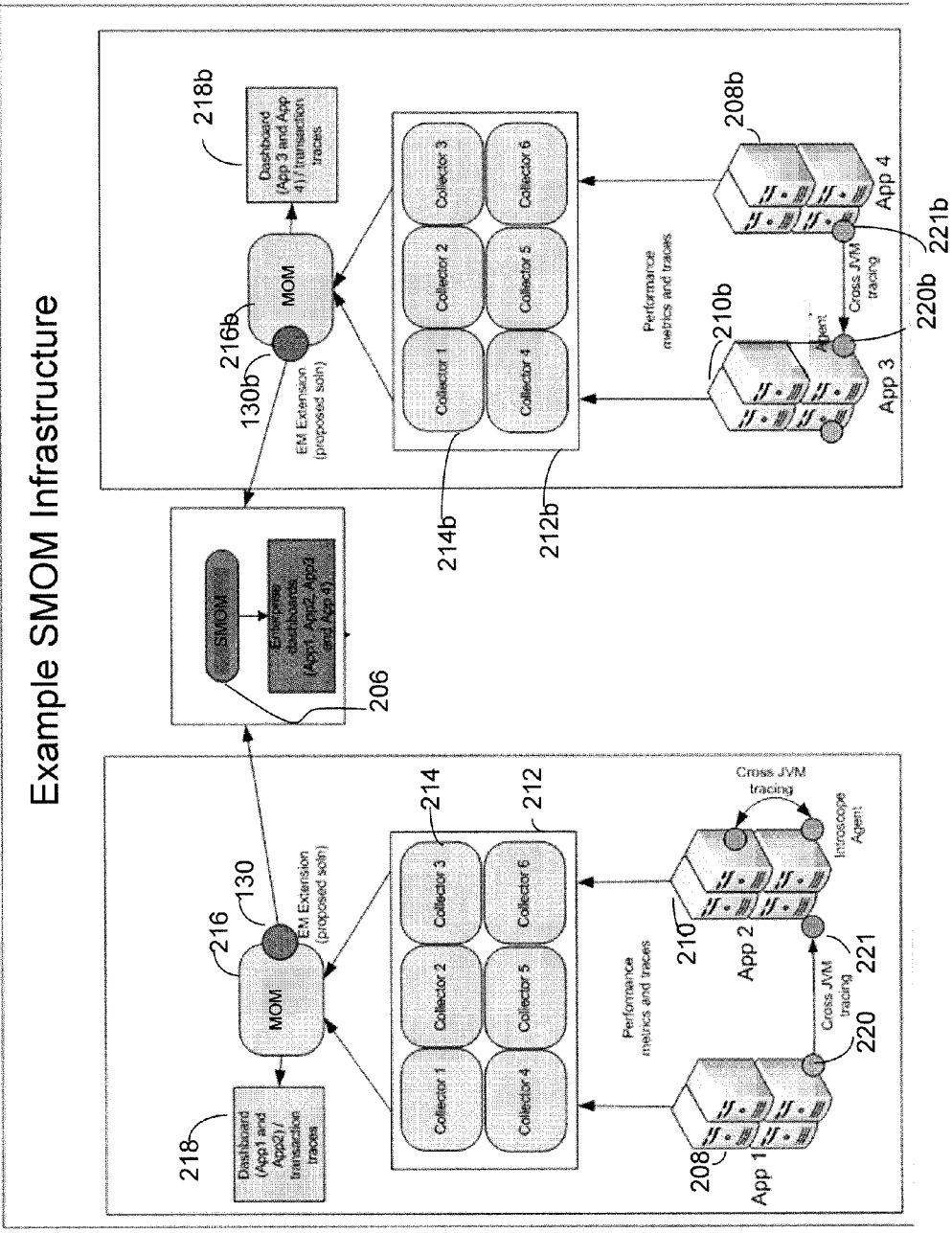
FIG. 2 illustrates a system providing consolidated summary performance metrics.

FIG. 2 illustrates another view of a system providing consolidated summary performance metrics. By way of example, FIG. 2 illustrates a SMOM 206 coupled to several MOMs (i.e., MOM 216 and MOM 216b). Of course, the teachings herein can also be applied to a SMOM 206 that can accommodate more MOMs. Each MOM (e.g., 216) accommodates one or more application servers, such as application servers 208 and 210. In the example of FIG. 2, agents 220 and 221 collect application and environmental performance metrics that pertain to application servers 208 and 210 respectively. One agent is used per server application process (e.g., Java Virtual Machine (JVM) or Common Language Runtime (CLR) instance. The metrics collected by agents 220 and 221 are reported (e.g., delivered) to their respective collector 214 (1 to 6 in this example). For example, a collector 214 collects information from multiple agents. The number or agents associated with each collector are limited by the number of metrics that the collector 214 can collect per polling interval.

Each collector 214 of the cluster 212 integrates the resources of several computing devices (e.g., collectors 214 (1 to 6)) together for a common purpose of tracking the performance metrics of their respective application servers (e.g., 208 and 210). Each collector 214 in the cluster 212 acts as a repository of performance metrics. It receives performance metrics from one or more agents (e.g., 220, 221) from their respective application servers 208 and 210. The metrics from all the collectors 214 for the cluster 212 are provided to the Manager of Managers (MOM) 216 which synthesizes the metrics information from the cluster of servers 212. MOM 216 communicates with each collector 214 (1 to 6) in its cluster 212 to obtain metrics data therefrom.

The server that includes MOM 202 also includes an Enterprise Manager Extension (EME) 130 to facilitate communication with a Summary Manager Of Managers (SMOM) 206. The EME 130 takes advantage of the facility available in many operating systems for one process to spawn a sub-process and receive standard output from the sub-process via operating system pipes, consistent with the Inter-process communication (IPC) mechanism. The ability to initiate a sub-process is combined with a flexible scripting environment (e.g., Perl) to provide the facility for gathering application performance information from virtually any source.

The SMOM 206 synthesizes the metrics information gathered by each MOM (e.g., 216 and 216b) and provides a unified view. For example, customer experiences and web infrastructure performance are provided from a single perspective. Accordingly, a technician or other person in the IT department having valid access to the SMOM 206 can learn about performance issues of all web applications across the entire enterprise covered by MOM 216 and MOM 216b from one single terminal. In this regard, FIG. 4 provides an exemplary screen-shot of unified view on a single terminal. A MOM (e.g., 216) can of course provide customer experiences and web infrastructure performance on its respective dashboard 218. In this regard, the information provided on the dashboard will be limited to the servers that MOM 216 covers (i.e., 208 and 210 in this example).

Figure 3:
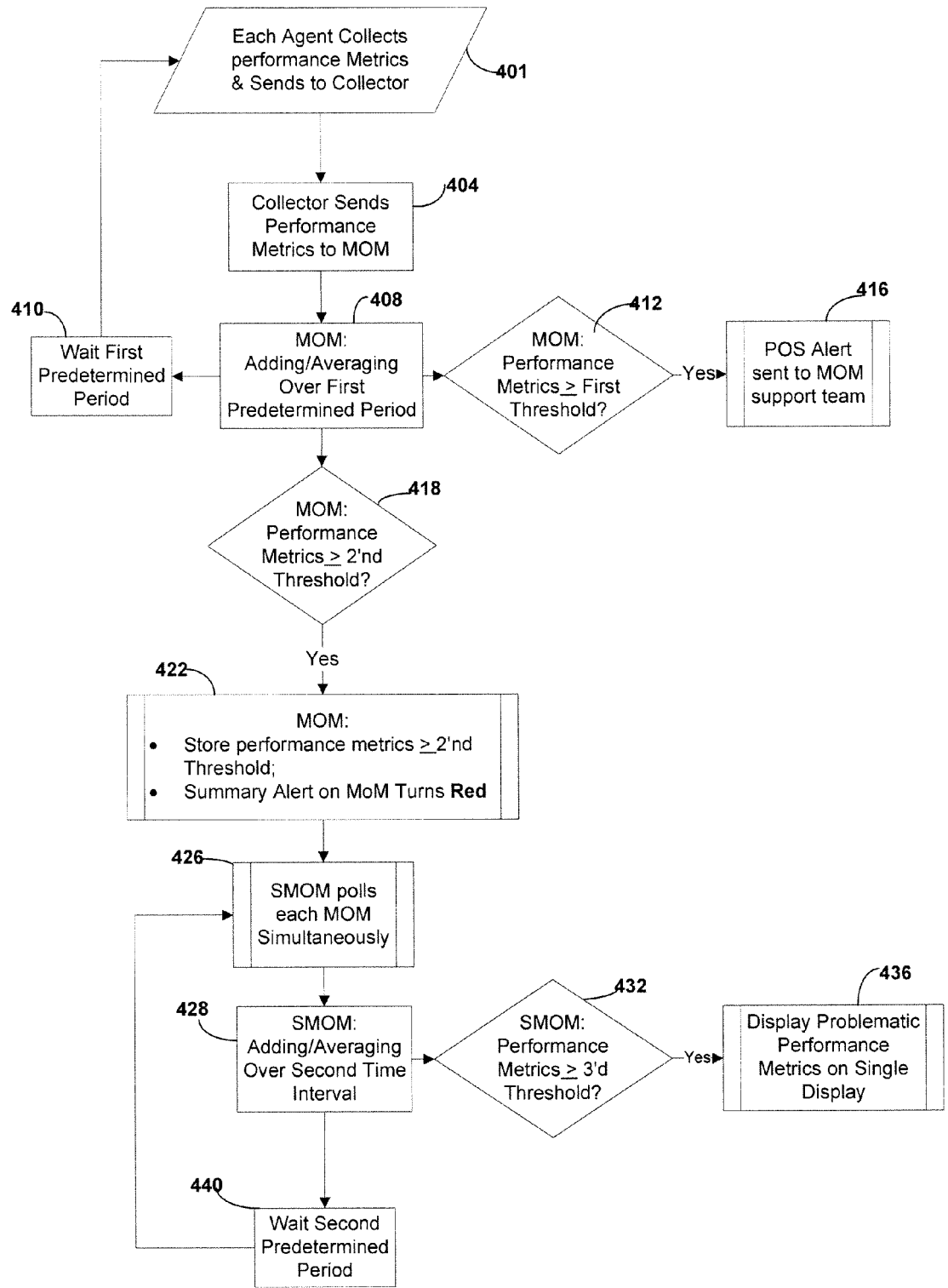
FIG. 3 illustrates an exemplary flow of a centralized audit and error handling system.

With the foregoing overview of an SMOM system, it may be helpful now to consider a high-level discussion of an example of centralized audit and error handling in a distributed application data processing system. In this regard, FIG. 3 illustrates an exemplary flow of a centralized audit and error handling system. In step 401, each agent collects data (i.e., performance metrics) with respect to one or more Point of Service (POS) Java Virtual Machines (JVMs). Thus, the agent identifies performance issues by gathering performance metrics, such as the number of failed transactions per server, average response times, number of lost connections, number of servers that are down, and the like. Each agent sends the gathered information (i.e., performance metrics) to its respective collector. Although illustrated as a single step for convenience, a substantial number of agents perform the step of collecting and sending to its respective collector in parallel.

In step 404, each collector sends the collected performance metrics to its respective manager of performance metrics (e.g., MOM). For example, the collectors in the cluster of servers send the performance metrics to their respective MOM in parallel (i.e., at the same time).

In step 408, each MOM adds and/or averages the performance metrics over a first predetermined period. The first predetermined period is the frequency in which the collector sends the performance metrics to their respective MOM. In one example, the first predetermined period is 15 seconds. Thus, if there are 75 failed transactions per server in a first time period of 15 seconds, the MOM averages this to 75/15=5 failed transactions per server every second. In another example, the MOM averages the transaction response time while simply adding the data of other performance metrics. The cycle repeats after the first predetermined period (i.e., 15 seconds in this example) expires, as indicated in step 410.

In step 412, the MOM determines whether the performance metrics meet a first predetermined criterion. For example, the first predetermined criterion may be a minimum error that should be reported to a support team at a MOM level. In one example, even if a single JVM is down, the first criterion (e.g., threshold) is met for that performance metric. It will be understood that there may be a different criterion for each performance metric.

In step 416, upon determining that a first criterion (or threshold) is met, a POS alert is sent to an application support team at a local MOM level to address the problem from the local MOM level.

In one example, the MOM also determines whether the performance metrics meet a second predetermined criterion. In one example, the second predetermined criterion is tighter (e.g., catches more severe failures) than the first predetermined criterion. The determination in this step may be quantitative or qualitative. For example, in step 418 the MOM may determine whether there are failures which are previously categorized as important (e.g., server crashes, loss of data, and the like). Alternatively, each MOM may determine whether a specific second predetermined criterion is met (e.g., 5 or more failed transactions per server per second). Thus the second predetermined criterion may be with respect to a determination of whether a severe event has occurred or whether a minimum number of failures have occurred. A different predetermined criterion may be used for each criterion.

In step 422, upon determining that a second predetermined criterion is met, the MOM stores these metrics in a local memory. In one example, the local dashboard for the respective MOM turns a different color than normal (e.g., as shown, from black to red) for each such metric (i.e., provides local alerts).

In step 426 the summary manager (SMOM) polls each MOM for performance metrics. Depending on the configuration file of each EME of a respective MOM, this may be either through a push or pull operation. In one example, the EME of the SMOM is configured to poll each MOM simultaneously at a frequency of a second predetermined period. By way of example, if the second predetermined period is one minute (while the first predetermined period is 15 seconds for each MOM), then the SMOM obtains four sets of performance metrics in each poll. That is because each MOM has generated 60 sec/15 sec=4 samples during the 1 minute sampling period of SMOM.

In step 428 the SMOM adds and/or averages the performance metrics over a second predetermined period. For example, with a sampling period of 1 minute for SMOM and a sampling period of 15 seconds for each MOM, the SMOM simply divides by four to obtain an average performance metric per second. In one example, the SMOM averages the transaction response time while simply adding the data for other performance metrics In one example, the SMOM makes a determination whether the performance metrics meet a third predetermined criterion (i.e., step 432). For example, the third predetermined criterion may be with respect to an average transaction response time. The third predetermined criterion may be identical to the second predetermined criterion or different. The third predetermined criterion may be tighter (e.g., have a higher threshold) than the second predetermined criterion in order to catch more severe errors. Also, a different predetermined criterion may be used for each performance metric.

In step 436, upon determining that the third predetermined criterion is met the respective performance metric(s) are displayed on a single display terminal, thereby summarizing the information harvested from several MOMs in a single view. The Summary Alert encompasses all the individual alerts that exist on each MOM. In one example, the performance metrics that have met a third predetermined criterion are marked in a different color (e.g., red). The cycle repeats after the second predetermined period (i.e., 1 minute in this example) expires, as indicated in step 440.

As shown by the above discussion, functions relating to performance monitoring and synthesis of the metrics information gathered by a number of managers of server groups may be implemented on computers and servers, as shown in FIGS. 1 and 2. Although special purpose equipment may be used, such devices also may be implemented using one or more hardware platforms intended to represent a general class of data processing device commonly used to run "client" and "server" programming so as to implement the performance monitoring functionality discussed above, albeit with an appropriate network link and connection capabilities for data communication.

Figures 5, 6:
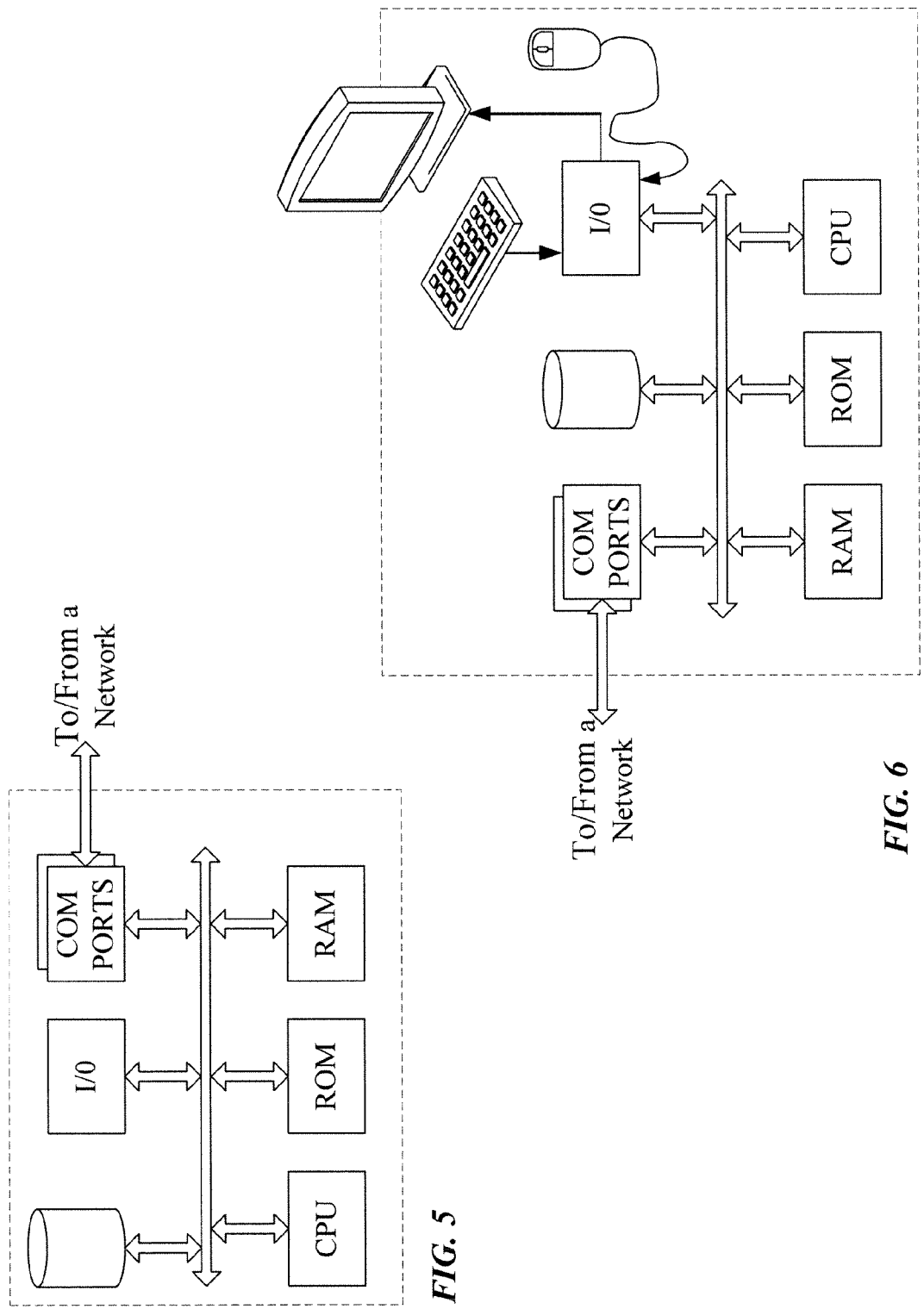
FIG. 5 illustrates a network or host computer.
FIG. 6 depicts a computer with user interface elements.

FIGS. 5 and 6 provide functional block diagram illustrations of general purpose computer hardware. FIG. 5 illustrates a network or host computer, as may be used to implement a server. FIG. 6 depicts a computer with user interface elements, as may be used to implement a personal computer or other type of workstation or terminal device, e.g. for use by IT department personnel, although the computer of FIG. 6 may also act as a server if appropriately programmed. It is believed that the general structure and general operation of such equipment as shown in FIGS. 5 and 6 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run application server programming, for example, to receive requests from client applications and send requested content so as to function as a web server 117 in FIG. 1. Servers may also provide information to their agents to allow monitoring of the server performance (e.g., agents 106 in FIG. 1). The collector, MOM, EME, and Summary MOM programming may run on general purpose computer platforms the same as or similar to those running the programming of the application servers 104.

A user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes.

The software functionalities involve programming, including executable code as well as associated stored data, e.g. files used for the applications, agents, MOMs, EMEs and/or Summary MOM. The software code is executable by the applicable computer hardware platform. In operation, the code is stored within the platform. At other times, however, the software may be stored at other locations and/or transported for loading into the appropriate hardware system. Execution of such code by a processor of the computer platform enables the computer to implement respective aspects of the monitoring methodology, in essentially the manner performed in the implementations discussed and illustrated herein.

Hence, aspects of the methods of pull data service outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

BS—Base Station
CA—Computer Associates
CLR—Common Language Runtime
CPU—Central Processing Unit
EM—Enterprise Manager
EME—Enterprise Manager Extension
EPROM—Erasable Programmable Read Only Memory
FLASH-EPROM—Flash Erasable Programmable Read Only Memory
IPC—Inter-Process Communication
IT—Information Technology
JVM—Java Virtual Machine
MOM—Manager Of Managers
PDA—Personal Digital Assistant
POS—Point of Service
PROM—Programmable Read Only Memory
RAM—Random Access Memory
ROM—Read Only Memory
SMOM—Summary Manager Of Managers

What is claimed is:
1. A method, comprising steps of:
monitoring performance of a plurality of application servers;
based on the monitoring, collecting performance metrics of the plurality of application servers in a plurality of clusters of collectors, wherein each collector is associated with a different group of application servers;

for each cluster of collectors, receiving collected performance metrics in a different respective manager of performance metrics;

synthesizing performance metrics of each cluster of collectors by each respective manager of performance metrics;

sending the synthesized performance metrics from the manager of performance metrics to a computer system running a summary manager;

summarizing the synthesized performance metrics from each manager of performance metrics in the summary manager; and providing the summarized synthesized performance metrics as an output presentation.

2. The method of claim 1, wherein:
the monitoring is performed by a plurality of agents;
each agent is associated with a different respective application server; and
a group of agents is associated with a different respective collector.

3. The method of claim 2, further comprising:
determining whether any performance metric has met any predetermined criterion; and
upon determining that any performance metric has met any predetermined criterion, marking the performance metric that has met any predetermined criterion as part of an output presentation.

4. The method of claim 1, wherein the summary manager manages the operation of each manager of performance metrics.

5. The method of claim 1, wherein each manager of performance metrics includes an Enterprise Manager Extension configured to facilitate communication with the summary manager.

6. The method of claim 1, wherein the summarized synthesized performance metrics are provided as an output presentation on a single terminal.

7. The method of claim 1, wherein each respective manager of performance metrics receives the performance metrics collected during a first predetermined period.

8. The method of claim 7, further comprising each manager of performance metrics averaging each received performance metric over the first predetermined period.

9. The method of claim 8, further comprising:
each manager of performance metrics determining whether any averaged performance metric over the first predetermined period has at least met a first predetermined criterion based on the received performance metrics from each respective cluster; and
upon determining that any performance metric has at least met the first predetermined criterion, triggering an alert on the respective manager of performance metrics.

10. The method of claim 9, further comprising sending notification of the alert to an IT support team for the respective manager of performance metrics that has determined that any performance metric has met the first predetermined criterion.

11. The method of claim 9, further comprising:
each manager of performance metrics determining whether any performance metric has at least met a second predetermined criterion based on the received performance metrics from each respective cluster; and
upon determining that any performance metric has at least met the second predetermined criterion, storing the performance metrics that have at least met the second predetermined criterion in a memory of the respective manager of performance metrics.

12. The method of claim 11, wherein the summary manager receives the performance metrics that have at least met the second predetermined criterion stored in each manager of performance metrics during a second predetermined period.

13. The method of claim 12, further comprising the summary manager averaging each received performance metric over the second predetermined period.

14. The method of claim 13, further comprising:
the summary manager determining whether any averaged performance metric over the second predetermined period has at least met a third predetermined criterion; and
upon determining that any averaged performance metric over the second predetermined period has at least met the third predetermined criterion, providing the performance metrics that have at least met the third predetermined criterion as an output presentation on a single terminal.

15. A system comprising:
a plurality of application servers;
a plurality of clusters of collectors, each cluster of collectors configured to collect performance metrics from different respective application servers from the plurality of application servers;
a plurality of managers of performance metrics, each manager of performance metrics configured to receive and synthesize collected performance metrics from their different respective cluster of collectors; and
a computer system running a summary manager, wherein the summary manager is configured to receive the synthesized performance metrics and provide the synthesized performance metrics as an output presentation.

16. The system of claim 15, further comprising:
a plurality of agents, wherein each agent is configured to monitor performance metrics of its respective application server.

17. The system of claim 15, wherein the summary manager is further configured to manage the operation of each manager of performance metrics.

18. The system of claim 15, further comprising a separate Enterprise Manager Extension (EME) associated with each different respective manager of performance metrics, wherein each EME is configured to facilitate communication between its different respective manager of performance metrics and the summary manager.

19. The system of claim 15, wherein the summary manager is further configured to provide a unified view of the synthesized performance metrics from each manager of performance metrics on a single terminal.

20. The system of claim 15, wherein each manager of performance metrics is configured to:
receive collected performance metrics collected during a predetermined first period; and
synthesize the performance metrics by averaging each performance metric over the first predetermined period.

21. The system of claim 20, wherein each manager of performance metrics is further configured to:
determine whether any averaged performance metric over the first predetermined period has at least met a first predetermined criterion based on the performance metric averaged over the first predetermined period; and
upon determining that a performance metric averaged over the first predetermined period has at least met the first predetermined criterion, trigger an alert on the respective manager of performance metrics.

22. The system of claim 21, wherein each manager of performance metrics is further configured to send notification of the alert to an IT support team for the respective manager of performance metrics that has determined that a performance metric has at least met the first predetermined criterion.

23. The system of claim 21, wherein each manager of performance metrics is further configured to:
   determine whether any performance metric has at least met a second predetermined criterion based on the performance metric averaged over the first predetermined period; and
   upon determining that any performance metric has at least met the second predetermined criterion, store the performance metrics that have at least met the second predetermined criterion in a memory of the respective manager of performance metrics.

24. The system of claim 23, wherein the summary manager receives the performance metrics that have at least met the second predetermined criterion stored in each manager of performance metrics during a second predetermined period.

25. The system of claim 24, wherein the summary manager is further configured to average each received performance metric over the second predetermined period.

26. The system of claim 25, wherein the summary manager is further configured to:
   determine whether any averaged over the second predetermined period performance metric has at least met a third predetermined criterion; and
   upon determining that any performance metric has at least met the third predetermined criterion, provide the performance metrics that have at least met the third predetermined criterion as an output presentation on a single terminal.

* * * * *